Oct. 28, 1969  A. R. McCONKEY  3,474,561
ICE FISHING RIG WITH SELF-CONTAINED AUTOMATIC CATCHER
Filed Oct. 19, 1967

Alfred R. McConkey
INVENTOR.

BY

United States Patent Office 3,474,561
Patented Oct. 28, 1969

3,474,561
ICE FISHING RIG WITH SELF-CONTAINED
AUTOMATIC CATCHER
Alfred R. McConkey, Oshkosh, Nebr. 69154
Filed Oct. 19, 1967, Ser. No. 676,423
Int. Cl. A01k 97/12, 85/02
U.S. Cl. 43—16                        3 Claims

ABSTRACT OF THE DISCLOSURE

An ice-fishing rig including a flat-faced panel to provide a base which has a hole therein lined up with an ice hole. A pull-responsive trigger has a line eye alined with both holes and a notched end pivoted on a stud providing a catch for a trippable end of a spring steel trip arm. One end of the arm is anchored on the base and the trippable free end is equipped with a line guide eye and a trip-up bit signalling flag. The arm sets the hook and actuates an automatic catcher which comes into play to reel the line in.

---

This invention relates to an ice fishing rig which is unique in that it features a wooden or an equivalent base panel which has a centrally pivoted trigger, a hook setting and bite signalling spring arm located at one end of the base panel, and a spring-loaded automatic fish catcher located at the other end of the base and which functions to reel in the line and fish in a reliable and acceptable manner.

It is common in this field of endeavor to provide a reel-equipped base with a trippable spring arm which serves as a tip-up, as shown, for example, in a patent issued to Dahlgren 2,924,038. Moreover, it is not new to provide an automatic fishing reel such as is shown in a patent to White, Jr., 2,577,552.

Briefly, the rig disclosed herein comprises, in combination, a panel-type base adapted to be positioned for use atop the ice, said base provided intermediate its ends with a fish line hole capable of being lined up with a fishing hole provided, as usual, in the ice. An automatic fish catcher is mounted atop the base to one side of said fishing hole and is characterized by a spring-containing housing and a spring-wound line reel which is mounted atop said housing. The housing is provided with spring tripping means subject to the pull of a fish on the line in a manner releasing the spring and for rotating the reel and landing the catch. A spring arm is located at the other end of said base and has one end anchored atop said base and its other end inclining upwardly and in a direction toward the intermediate portion of said base and terminating in a line guide eye. A post is fixed on a median portion of the base adjacent the hole and supports a finger which has a notched end pivotally mounted atop the post. This finger constitutes a trigger and has a free end provided with a line guide eye registering with said holes. The notch constitutes a keeper and the free end of said arm provides a trip which releasably engages with said keeper and portions of said line are slidingly threaded through the line guide eye on said arm, then through the line guide eye on said finger in a manner to descend through the line guide hole in said base. The arm carries a flag and serves as a visual-type tip-up.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3:
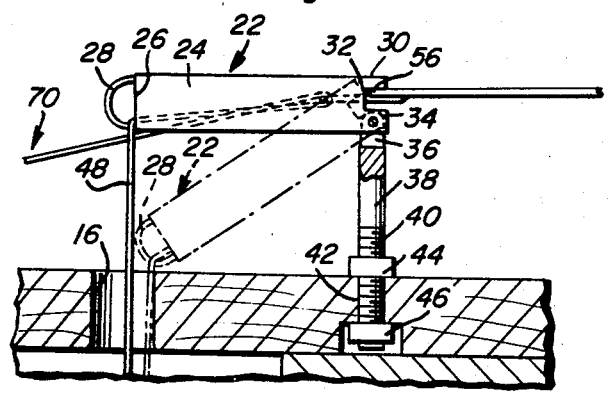

And FIG. 3 is a fragmentary and further enlarged view detailing the trigger in its full and phantom line positions and showing the trippable end of the arm engaged in the keeper notch hereinafter referred to as the releasable catch.

Figure 1:
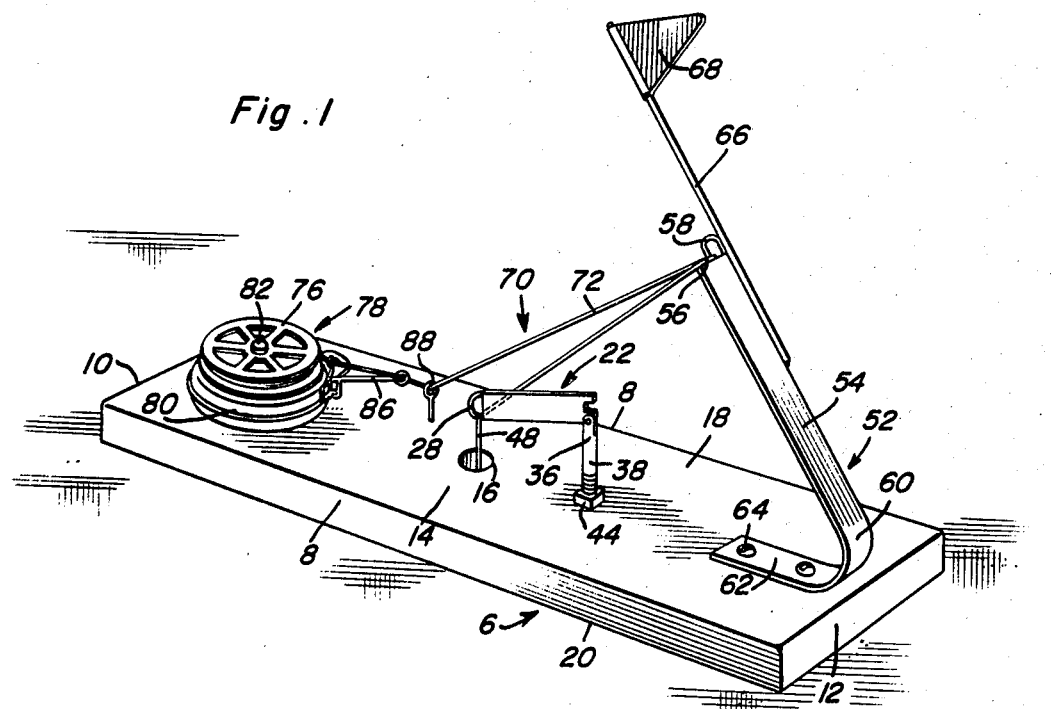
FIG. 1 is a view in perspective of an ice fishing rig provided with the aforementioned self-contained automatic line winding catcher and wherein the tip-up arm is shown released from the trigger and with the bite-signalling flag in its up position.
Figure 2:
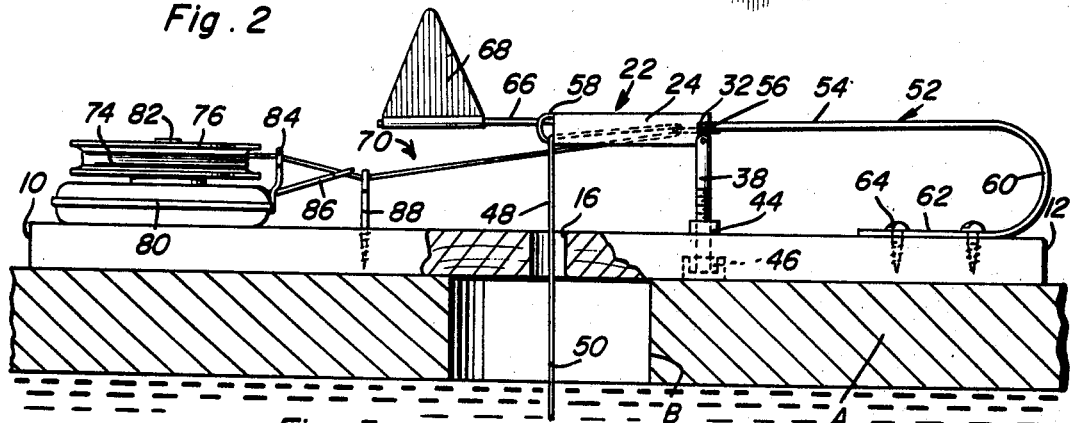
FIG. 2 is a view on a slightly enlarged scale which also shows the same rig but illustrates the manner in which the tip-up arm is trippably engaged with the catch on the trigger and with the trigger set to make a catch.

The over-all rig and component parts thereof appear in FIGS. 1 and 2 in particular. The base preferably, but not necessarily, comprises a wooden or an equivalent generally rectangular panel denoted generally by the numeral 6. This panel has spaced, parallel, longitudinal side edges 8 and transverse left and right end portions 10 and 12, respectively. The central or median portion 14 is provided with a vertical hole which constitutes a fishing line hole and is denoted at 16. The panel has a flat top surface 18 and a correspondingly flat bottom surface 20 which is adapted to reside flatwise and firmly atop the ice A in a manner that the hole 16 is in line with the ice hole B.

The aforementioned trigger is denoted generally by the numeral 22 and comprises a suitable finger 24 having a free end portion 26 provided with a guide eye which is also referred to as a D-ring 28. The right hand end portion (FIG. 3) of the finger, that is, the portion 30, has a kerf or notch formed therein as at 32 to provide a trip-setting catch or keeper. One of the furcations 34 is pivoted on an upper end portion 36 of an upright. More specifically the upright comprises a simple stud or post 38 having a screw-threaded lower end 40 extending through a hole 42 provided therefor in the base and held in place by assemblying and clamping nuts 44 and 46. The post is adjacent the hole and the length of the finger is such that the line guide 28 moves in an arcuate path relative to the line hole 16 in the base. A portion 48 of the line is guidingly threaded through the guide eye 28 and extends down through the hole 16 and then down through the ice hole in the manner denoted at 50 in FIG. 2.

The trippable arm, also referred to as a spring-biased tip-up is denoted generally by the numeral 52 and comprises a flat resilient stainless steel or equivalent spring strip. The main arm portion 54 has a free end portion 56 which provides the trip and which is releasably engageable with the keeper 32 in the manner shown in FIGS. 2 and 3 when the rig is set for fishing. This trippable end portion is provided to one side thereof with a D-ring which constitutes a second line guide ring as at 58. The lower median portion of the arm is bent upon itself to provide a return-bend at 60 and the terminal end portion 62 is superimposed on and secured atop the end portion 12 of the base panel as at 64. The staff 66 carried by the arm is equipped with a suitable bite-signalling flag 68. The over-all fishing line is denoted at 70 and a portion 72 thereof is threaded through the guide eye 58 and then descends and is threaded through the guide eye 28 as shown in the views of the drawing. The left-hand end portion of this line is wound as at 74 on the open periphery of a spool or reel 76 constituting a component part of the aforementioned automatic fish catcher. This catcher is denoted as an entity by the numeral 78 and is amply shown to serve in combination with the trigger and arm 22 and 52, respectively. It should perhaps be pointed out here that the automatic fishing device or reel here shown is comparable to the one shown and covered in a patent issued to J. W. White, Jr., 2,577,552 of Dec. 4, 1951. The fish catcher in the instant adaptation is a component of the over-all combination and is shown, described and claimed as such. It comprises a spring-containing circular housing 80 which is fixed atop the left-hand end portion of the base. Thus the fish catcher is to the left of the hole 16 and the bite-signalling and tip-up arm 52 is to the right of the hole 16 as well as the post-supported trigger 22. The reel is mounted on a shaft 82 atop the housing. There is a fixed guide eye at 84 and a pivoted and trippable pull-responsive eqe at 86. In addition, there is a fixed auxiliary line guide eye at 88 on the base adjacent to the two eyes 84 and 86. Since this device 78 is automatic and pull-responsive, a more extended description of the same is deemed to be unnecessary.

In practice, the line 70 is threaded through the eyes 84, 86, 88 and then through the guide eyes 58 and 28 where it descends as at 50 through the ice hole B. The device is shown in its released position in FIG. 1 and in its set position in FIG. 2. It will be evident therefore that when the fish takes the hook (not shown) the pull on the line serves to trip the arm 52 which springs up to the signalling position shown and at the same time releases the automatic catcher, whereupon the catcher comes into play to reel-in the line and the fish thereon.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A portable ice fishing rig comprising, in combination, a horizontally elongated panel constituting a base and adapted to be positioned for use atop the ice, said panel being provided intermediate its respective ends with a fish line accommodating hole capable of being lined up with a hole provided therefor in the ice, an automatic fish catcher mounted atop one end portion of said base to one side of said hole, said catcher characterized by a spring-containing housing with a spring-wound line reel mounted atop said housing, said housing provided with spring tripping means subject to the pull of a fish on the line in a manner to release the spring and for rotating the reel and pulling in the catch, a spring strip member providing a tip-up arm and located at the other end portion of said base and having a lower return-bent end superimposed upon and anchored atop said base and an upper end inclining upwardly and in a direction toward the intermediate portion of said base and terminating in a releasable trip and a fixed line guide eye, a post fixed vertically atop a median portion of the base adjacent said line hole in said base, a finger having a bifurcated end, one of said bifurcations being pivotally mounted atop said post, said bifurcations defining a notch therebetween, said finger having a free end portion provided with a line guide eye registering with said hole in said base, said notch constituting a keeper, said trip being releasably engageable with said keeper, portions of the line from said reel being adapted to be slidingly threaded through (1) the line guide eye on said arm and (2) through the line guide eye on said finger in a manner to descend through the line guide hole in said base.

2. The ice fishing reel defined in and according to claim 1 with the free end portion of said arm having secured thereto an outstanding staff having a free end provided with a flag, said arm and flag conjointly providing a bite-signalling tip-up.

3. The ice fishing rig defined in and according to claim 2 and in combination, a line guide mounted on a peripheral portion of said housing, and an adjacent but separate auxiliary line guide fixedly mounted on said base and spaced from the line guide means on said housing, said line guides being located on one side of said line guide hole in said base with said post being located on the opposite side thereof.

References Cited
UNITED STATES PATENTS

| | | | |
|---|---|---|---|
| 77,893 | 5/1868 | Koehler | 43—15 |
| 1,996,704 | 4/1935 | Hawkinson | 43—16 |
| 2,554,927 | 5/1951 | Schultz | 43—16 |
| 2,577,552 | 12/1951 | White | 43—15 X |
| 3,017,715 | 1/1962 | Kennedy | 43—16 |

SAMUEL KOREN, Primary Examiner

D. J. LEACH, Assistant Examiner